United States Patent [19]

Smith

[11] Patent Number: 5,168,438
[45] Date of Patent: Dec. 1, 1992

[54] SELECTABLE DUAL RECTIFIER POWER SUPPLY FOR MUSICAL AMPLIFIER

[75] Inventor: Randall C. Smith, 1317 Ross St., Petaluma, Calif. 94952

[73] Assignee: Randall C. Smith, Petaluma, Calif.

[21] Appl. No.: 822,368

[22] Filed: Jan. 17, 1992

[51] Int. Cl.$^5$ ............................................. H02M 7/12
[52] U.S. Cl. ..................... 363/67; 363/114; 363/125; 363/126; 307/82
[58] Field of Search ................. 363/65, 67, 69, 70, 363/114, 125, 126; 307/6, 58, 80, 82

[56] References Cited

U.S. PATENT DOCUMENTS 4,555,753  11/1985  Takahashi ........................ 363/126

Primary Examiner—Emanuel T. Voeltz
Attorney, Agent, or Firm—James E. Eakin

[57] ABSTRACT

A power supply for use with a musical amplifier includes two user-selectable rectifiers for variously enhancing sound generated by a musical instrument such as a guitar, or by recorded musical material which in either case consists of electrical signals applied to a vacuum tube amplifying apparatus. The first of two rectifiers comprises one or more thermionic vacuum tube devices, depending upon power needs, while the second rectifier is comprised of solid-state silicon diodes. A switch circuit enables the user to select which of the two rectifier devices is better suited to the contemporaneous use of the amplifier.

2 Claims, 2 Drawing Sheets

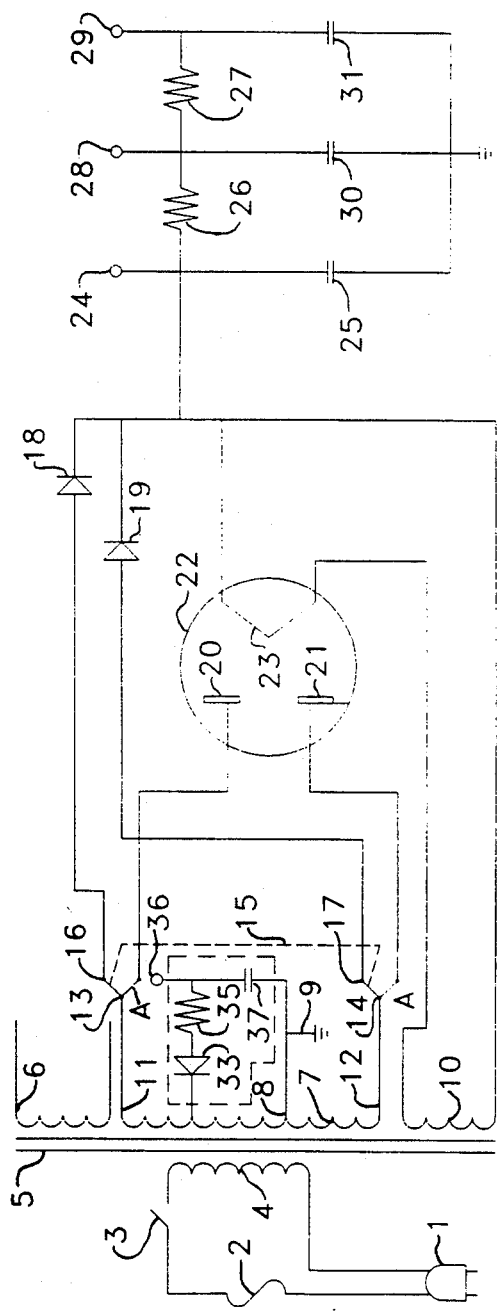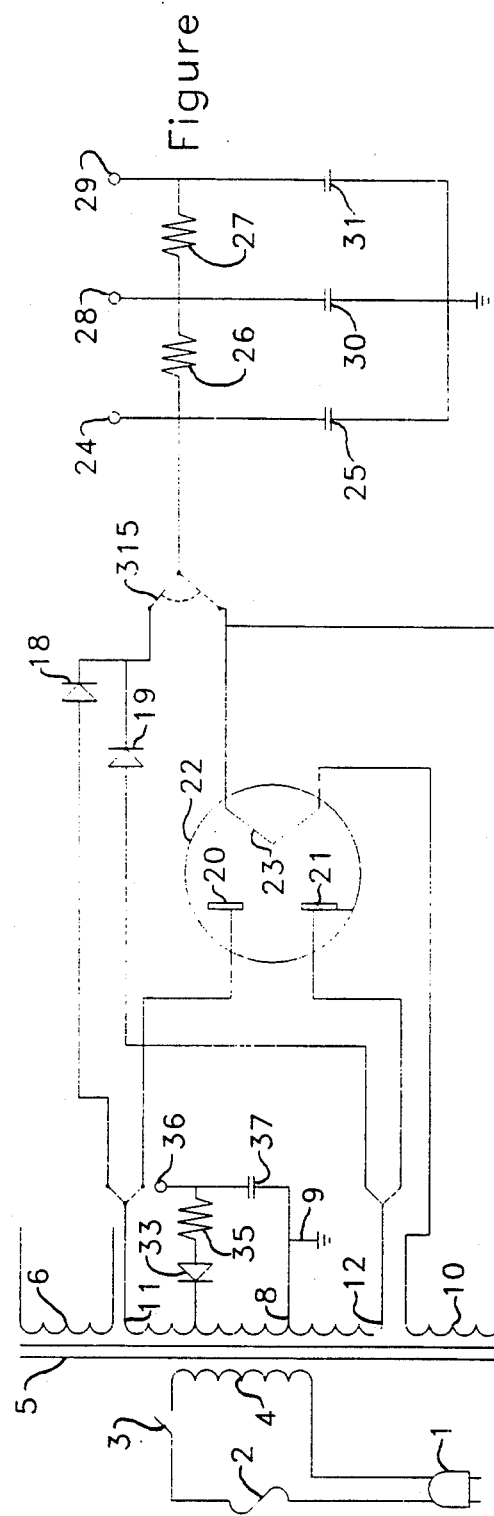

SELECTABLE DUAL RECTIFIER POWER SUPPLY FOR MUSICAL AMPLIFIER

FIELD OF THE INVENTION

The present invention relates to electronic amplifiers for musical instruments, particularly guitar, as well as electronic amplifiers for playback of recorded musical media, and more particularly relates to power rectifier circuits for such amplifiers.

BACKGROUND OF THE INVENTION

Music is one of the most subjective of all areas. Enhancement of the musical experience—whether playing or listening—depends upon numerous subjective and objective factors, and the number of relevant factors increases greatly when the art of electronic amplification is involved.

Music aficionados—and particularly guitar players—have long sought variations in electronic techniques which enhance the aesthetic experience of the musician and the listener. One of the areas in which numerous electronic techniques have been tried for enhancement of the musical experience is the use of vacuum tube amplifiers instead of, in addition to, or in conjunction with solid state amplifiers. Many musicians remain firmly convinced that the tube amplifier provides a superior sound for many types of music, despite the proliferation of solid state devices throughout the music industry.

While the desirable sonic characteristics of tube amplifiers for guitars are well known, power supplies for such amplifiers have long been considered sonically neutral. As a result, the typical guitar amplifier provides solid state rectification of AC to DC due to the lower cost and generally greater reliability of the solid state device compared to its thermionic counterpart.

At the same time, many "vintage" instrument amplifiers are much sought after for their ability to recreate the sounds and musical styles of various bygone eras. Unfortunately, such vintage amplifiers typically have deteriorated with age and have become unreliable to the extent that use of such vintage devices is unacceptable. Even in those instances where the performance is satisfactory when measured against the original specifications for the equipment, musicians frequently find that such equipment is extremely limited by today's standards of versatility. Likewise, the equipment is limited to producing only one style of music at one particular volume, for it was most likely under those particular conditions that a landmark recording was made and an identifiable and sought after tone produced.

There has therefore been a need for equipment capable of producing the tones of quality vintage equipment while at the same time providing the versatility and reliability more commonly associated with modern equipment. In addition, it has now been discovered that the common wisdom about rectification overlooks desirable characteristics of tube-based rectifiers.

SUMMARY OF THE INVENTION

In accordance with the present invention, it has been discovered that, under at least some playing conditions, rectifiers are not sonically neutral nor is the solid state rectifier universally superior in a musical application. Instead, the choice of rectifying devices can be shown to play an important role in the stylistic characteristics of the associated amplifier, the music it produces, and the overall effect the amplifier has on the musician's creative sensibilities.

More specifically, the present invention provides a selectable dual rectifier power supply having tube-type and solid state rectifiers for selectively enhancing the stylistic and performance characteristics of the amplifier. The first, tube-based rectifier can be selected for faithful recreation of classic music sounds, while the second, solid state rectifier can be selected for creation of a more technical sound. Such selectability is of particular importance for musical instrument amplifiers—and most especially electric guitar amplifiers—where the performance of the amplifier comprises a significant portion of the total musical instrument. Because the musical playing/listening experience is one which is influenced by even subtle cues in the performance of the instrument, the capability of selecting between solid state and vacuum thermionic rectification—with their attendant side effects—greatly enhances the stylistic versatility of the amplifier.

In addition, the present invention, coupled with an appropriate amplifier, satisfies the need for an instrument which combines the reliability, versatility and stylistic possibilities of the contemporary state of the art while at the same time providing the ability to faithfully recreate a broad spectrum of identifiable and useable classic sounds as well as the associated playing sensations of the archaic electronic instruments which originally created them.

The performance differences between the two types of rectification can be maximized so as to increase the stylistic impact each has on the total instrument. This can be accomplished by selecting a vacuum thermionic rectifier device which, under maximum current demands, operates near its rated maximum. In so doing, the inherent voltage drop is maximized and, more importantly, the dynamic characteristic of the thermionic device is also maximized. This dynamic characteristic, namely increasing internal resistance as a function of load current, augments the amplifier's own dynamic response as compared to the constant voltage drop of the solid state diode, to the point of becoming very noticeable—and often quite desirable—to the musician playing a dynamic instrument such as an electric guitar. Alternately, when louder volume, maximum undistorted headroom and harder transient attack are desired, use of the solid state rectifier can dramatically accomplish this and may be preferred.

Since power requirements for musical amplifiers can vary greatly, and the circuits necessary to provide lower power levels differ somewhat from those used for higher powers level, two embodiments are provided for use with different power requirements. In addition, a third embodiment is shown wherein power is continuously applied to both types of rectifiers, and switching is providing at their respective outputs.

It is therefore a general object of the present invention to provide a power supply for a musical instrument or playback amplifier which improves upon the state of the art by providing selectable rectification modes.

It is another object of the present invention to provide a selectable dual rectifier power supply which is capable of enhancing the stylistic and performance characteristics of the amplifier.

A still further object of the invention is to provide a power supply for use with a musical amplifier which the user can operate selectively in either solid state rectification mode or vacuum thermionic rectification mode.

Yet another object of the present invention is to provide a dual rectifier device for use with musical amplifiers in which the stylistic impact of the different rectifiers is substantially maximized.

These and other objects, advantages and features of the present invention will become apparent to those skilled in the art upon consideration of the following detailed description of the preferred embodiments, taken in conjunction with the accompanying drawings.

BRIEF DESCRIPTION OF THE DRAWINGS

FIG. 1 is a schematic diagram of an amplifier power supply incorporating the principles of the present invention for use with an amplifier of low to moderate power.

FIG. 3 is a schematic diagram of an amplifier power supply essentially identical to that shown in FIG. 1, except that switching between the different types of rectifiers is performed at the output of the rectifiers.

DETAILED DESCRIPTION OF THE INVENTION

Figure 2:
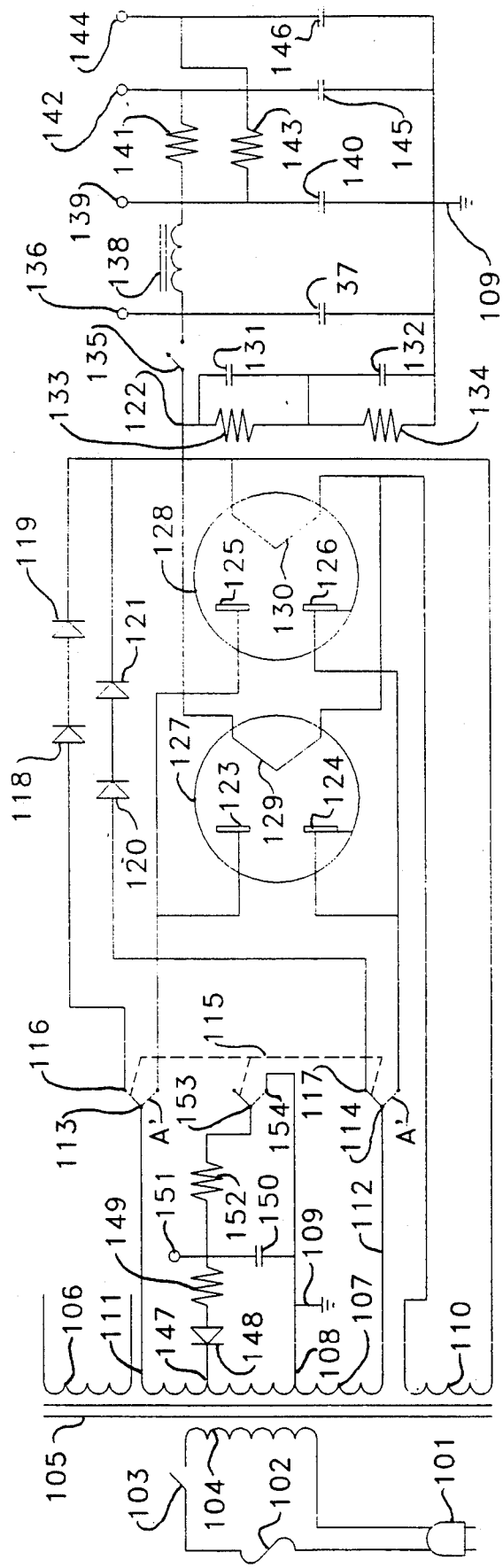
FIG. 2 is a schematic diagram of an amplifier power supply incorporating the principles of the present invention for use with an amplifier of moderate to high power.

With reference to FIG. 1, an amplifier power supply circuit according to the present invention includes a conventional connection 1 for receiving AC power, connected through a conventional fuse 2 and a power on/off switch 3 to the primary winding 4 of a power transformer 5.

The power transformer 5 includes a plurality of secondary windings, including a 6.3 volt heater winding 6, a high voltage secondary 7 with a center tap 8 connected to ground 9, and a five volt filament winding 10. High voltage from the two terminals 11 and 12 of the secondary winding 7 is connected to the center poles 13 and 14 of a double-pole-double-throw switch 15, which has throws 16 and 17. One of each of throws 16 and 17 connect to the anode ends of a pair of solid state rectifying diodes 18 and 19, typically silicon diodes, such that rectified voltage B+ appears at point 24.

When the switch 15 is selected to its alternate position, as indicated by the dashed line A, high voltage AC from the ends 11 and 12 of the winding 7 is applied to the anodes 20 and 21 of a vacuum thermionic rectifier 22. A filament 23 of the rectifier 22 is heated by the secondary winding 10. Rectified voltage B+ from the filament 23, sometimes referred to as the heater/cathode, of the thermionic rectifier 22 is connected to the point 24.

A filter capacitor 25 smooths the ripple from the rectified DC in a conventional manner. A pair of dropping resistors 26 and 27 apply voltage to two more power supply points 28 and 29, to which other stages of an amplifier circuit (not shown) may be connected, while decoupling is accomplished by filter capacitors 30 and 31.

In the case of an amplifier circuit using cathode bias throughout, the power supply circuit described above would be complete. Cathode bias in the power output devices provides the advantage of its natural tendency to compensate for B+ voltage changes which natuṛalky occur from switching between the solid state rectifiers 18 and 19, and the vacuum thermionic rectifier 22.

However, fixed bias from a supply shown in dashed box 32 can be successfully used in such a power amplifier circuit even though the B+ operating voltage will differ significantly depending upon which rectifier type is selected. Such a bias supply as shown inside the dashed box 32 would include a rectifying diode 33 whose cathode end is fed from a tap 34 of the secondary winding 7, and connected through a filter resistor 35 to a bias supply output point 36 where rectified DC is filtered by a capacitor 37.

Referring next to FIG. 2, a power supply circuit for somewhat higher power outputs is described. As in FIG. 1, AC power is connected through a plug 101, fuse 102 and On/Off switch 103 to the primary winding 104 of a power transformer 105. Again, several secondary windings are provided, including a heater winding 106, a high voltage winding 107 with a center tap 108 connected to ground 109, and a five volt filament winding 110.

High voltage from terminals 111 and 112 of the secondary winding 107 is connected to two center poles 113 and 114 of a three-pole-double-throw switch 115. Of this switch 115, one each of the poles 116 and 117 is connected to the anode end of a pair of silicon rectifying diodes 118 and 119 which are arranged in series with a second pair of silicon diodes 120 and 121 in order to increase rectifier capacity, such that rectified DC appears at a point 122.

When the switch 115 is selected to its alternative position (as indicated by the dashed lines A'), high voltage AC from the terminals 111 and 112 of the secondary winding 107 is applied to anodes 123, 124, 125 and 126 of a pair of thermionic rectifiers 127 and 128 whose filaments 129 and 130 are heated by power from secondary winding 110. Rectified B+ voltage from the filaments or heater/cathodes 129 and 130 is connected to a point 122. A pair of filter capacitors 131 and 132 to smooth the DC ripple are arranged in series to increase their voltage with-stand capability and have a pair of bleeder resistors 133, 134 connected in parallel with them.

A Standby Switch 135 connects B+ voltage from point 122 to a point 136 where the center tap of an output transformer (not shown) would derive its power. A capacitor 137, connected between point 136 and ground, is of a small value and serves the function of preventing unwanted popping sounds and/or oscillation which otherwise may occur for a few seconds after switching to standby. Following conventional practice in higher power amplifiers, a filter choke 138, is used to provide minimal voltage drop to a point 139 from whence output tube screen grids (not shown) would derive their supply.

Decoupling is accomplished by capacitor 140. Resistors 141 and 143 supply points 142 and 144 which would power other stages of the audio amplifier circuit (not shown). Decoupling is provided by capacitors 145, and 146. Voltage for a negative bias supply derives from a tap 147 of the high voltage secondary winding 7 and feeds the cathode end of a rectifier diode 148. Filtering is accomplished by capacitor 150 across resistor 149 which also serves as the series element of a switchable shunt. Bias voltage appearing at a supply point 151 may be raised or lowered in conjunction with the selection of high voltage rectifier in order to more closely maintain desired operating parameters. This is accomplished by coupling the bias supply output point 151 through a shunt resistor 152 to the remaining pole 153 of the three-pole switch 115. When the higher output silicon rectifiers are selected, the bias voltage dropping shunt is disconnected and bias voltage increases. When the thermionic rectifiers are chosen and B+ voltage decreases, the shunt resistor is connected to ground 109 through pole 154 of the switch 115.

With reference now to FIG. 3, a slightly different approach is provided for switching between types of rectifiers. It will be appreciated that the device shown in FIG. 1 operates by switching the input power from one type of rectifier to another. The device shown in FIG. 3 is essentially identical to that shown in FIG. 1, except that power is continuously applied to both types of rectifiers and the switching is performed immediately downstream of the rectifiers. For ease of understanding the differences between FIG. 1 and FIG. 3, components have been assigned like reference numerals. Thus, the primary difference is that switch 15 in FIG. 1 is eliminated but functionally replaced by switch 315 in FIG. 3. In addition, terminals 11 and 12 now connect directly both to the diodes 18 and 19 and to the thermionic rectifier 22.

Having fully described two embodiments of the present invention, it will be apparent to those of ordinary skill in the art that numerous alternatives and equivalents exist which do not depart from the invention set forth above. For example, bridge rectifier arrangements may be substituted for the full wave center tap configurations in a known manner which will achieve substantially identical results. It is therefore to be understood that the invention is not to be limited by the foregoing description, but only by the appended claims.

What is claimed is:

1. A dual rectifier power supply for use with musical amplifiers comprising
   input means for providing a source a AC power,
   a first, solid state rectifying means for converting AC power to rectified DC power and having an output,
   a second, vacuum thermionic rectifying means for converting AC power to rectified DC power and having an output,
   switch means accessible to the user of the power supply for selectively connecting the input means either to the first rectifying means or to the second rectifying means,
   output means connected to the outputs of the first and second rectifying means for providing a source of rectified DC power in a manner adapted to be connected to a musical amplifier.

2. A dual rectifier power supply for use with musical amplifiers comprising
   input means for providing a source a AC power,
   a first, solid state rectifying means connected to the input means for converting AC power to rectified DC power and having an output,
   a second, vacuum thermionic rectifying means connected to the input means for converting AC power to rectified DC power and having an output,
   switch means accessible to the user of the power supply for selectively connecting either to output of the first rectifying means or to output of the second rectifying means, and
   output means connected to the switch means for providing a source of rectified DC power in a manner adapted to be connected to a musical amplifier.

* * * * *